US012083554B2

(12) United States Patent
Opstad

(10) Patent No.: US 12,083,554 B2
(45) Date of Patent: Sep. 10, 2024

(54) SPRAYING OF MICROFIBRILLATED CELLULOSE

(71) Applicant: Borregaard AS, Sarpsborg (NO)

(72) Inventor: Anne Opstad, Sarpsborg (NO)

(73) Assignee: Borregaard AS, Sarpsborg (NO)

( * ) Notice: Subject to any disclaimer, the term of this patent is extended or adjusted under 35 U.S.C. 154(b) by 433 days.

(21) Appl. No.: 17/311,672

(22) PCT Filed: Dec. 16, 2019

(86) PCT No.: PCT/EP2019/085306
§ 371 (c)(1),
(2) Date: Jun. 7, 2021

(87) PCT Pub. No.: WO2020/127017
PCT Pub. Date: Jun. 25, 2020

(65) Prior Publication Data

US 2022/0023912 A1 Jan. 27, 2022

(30) Foreign Application Priority Data

Dec. 17, 2018 (EP) .................................... 18213187

(51) Int. Cl.
*B05D 1/12* (2006.01)
*B05D 3/02* (2006.01)
*D21C 9/00* (2006.01)
*D21H 11/18* (2006.01)

(52) U.S. Cl.
CPC ................. *B05D 1/12* (2013.01); *B05D 3/02* (2013.01); *D21C 9/007* (2013.01); *D21H 11/18* (2013.01)

(58) Field of Classification Search
CPC ............... B05D 1/02; B05D 1/12; B05D 3/02
See application file for complete search history.

(56) References Cited

U.S. PATENT DOCUMENTS 4,341,807 A 7/1982 Turbak et al.
4,374,702 A * 2/1983 Turbak ..................... D21B 1/36 162/100
4,481,077 A 11/1984 Herrick
4,593,360 A * 6/1986 Cocks ..................... B05B 12/14 239/416
5,637,197 A * 6/1997 Watt ..................... C09D 101/02 162/149
2012/0132106 A1* 5/2012 Damani .................. C23C 4/134 427/451
2014/0004260 A1* 1/2014 Fuchita ................... C23C 24/02 427/191
2017/0306562 A1* 10/2017 Phipps ..................... D04H 1/54
2017/0342661 A1* 11/2017 Aulin ..................... D21H 27/10
2020/0248042 A1 8/2020 Holtan et al.
2020/0270428 A1 8/2020 Holtan et al.
2020/0318289 A1 10/2020 Opstad et al.

FOREIGN PATENT DOCUMENTS

EP 0228779 * 7/1987 .............. C12P 19/04
EP 2406567 A1 1/2012
WO WO-2007/091942 A1 8/2007
WO WO-2010/102802 A1 9/2010
WO WO-2015/180844 A1 12/2015
WO WO-2018/138702 A1 8/2018

OTHER PUBLICATIONS

Beneventi, D., et al., "Pilot-scale elaboration of graphite/microfibrillated cellulose anodes for Li-ion batteries by spray deposition on a forming paper sheet". Chemical Engineering Journal 243 (2014) pp. 372-379.*
Vartianen, Jari, et al., "Health and environmental safety aspects of friction grinding and spray drying of microfibrillated cellulose". Cellulose (2011) 18: 775-786.*
Beneventi, Davide, et al., "Rapid nanopaper production by spray deposition of concentrated microfibrillated cellulose slurries". Industrial Crops and Products, 72 (2015) 200-205.*
Beneventi, Davide, et al., "Highly Porous Paper Loading with Microfibrillated Cellulose by Spray Coating on Wet Substrates". Ind. Eng. Chem. Res. 2014, 53, 10982-10989.*
Mirmehdi, Seyedmohammad, et al., "Spraying Cellulose Nanofibrils for Improvement of Tensile and Barrier Properties of Writing & Printing (W&P) Paper". Journal of Wood Chemistry and Technology, 0:1-13, 2018.*
Beneventi, D. et al., Pilot-scale elaboration of graphite/microfibrillated cellulose anodes for Li-on batteries by spray deposition on a forming paper sheet, Chemical Engineering Journal, 243:372-379, (2014).
International Search Report for PCT/EP2019/085306, filed Dec. 16, 2019, 3 pages, (Feb. 20, 2020).
Shanmugam, K. et al., Rapid preparation of smooth nanocellulose films using spray coating, Cellulose, 24:2669-2676, (2017).
Written Opinion for PCT/EP2019/085306, filed Dec. 16, 2019, 8 pages, (Feb. 20, 2020).

* cited by examiner

*Primary Examiner* — Bret P Chen
(74) *Attorney, Agent, or Firm* — Choate, Hall & Stewart LLP; Michael D. Schmitt

(57) ABSTRACT

A process for the spraying of microfibrillated cellulose (MFC) is presented, which has a comparatively high solids content, onto a surface, thus forming a stable and homogeneous film coating of MFC on said surface. Therein, the MFC of the comparatively high solids content is subjected to a pressure drop in a nozzle, which pressure drop exerts shear pressure onto the MFC, thus lowering the viscosity during the spraying and coating process.

19 Claims, 4 Drawing Sheets

SPRAYING OF MICROFIBRILLATED CELLULOSE

FIELD OF THE INVENTION

The present invention relates to a process for the spraying of microfibrillated cellulose (MFC), which has a comparatively high solids content, onto a surface, thus forming a stable and homogeneous film coating of MFC on said surface. Therein, the MFC of the comparatively high solids content is subjected to a pressure drop in a nozzle, which pressure drop exerts shear pressure onto the MFC, thus lowering the viscosity during the spraying and coating process.

BACKGROUND OF THE INVENTION

Microfibrillated cellulose (also known as "reticulated" cellulose or as "superfine" cellulose, or as "cellulose nanofibrils", among others and also referred to as "MFC" in the following) is a cellulose-based product and is described, for example, in U.S. Pat. Nos. 4,481,077, 4,374,702 and 4,341,807. According to U.S. Pat. No. 4,374,702 ("Turbak"), microfibrillated cellulose has reduced length scales (diameter, fibril length) vis-à-vis cellulose fibers, improved water retention and adjustable viscoelastic properties. MFC with further improved properties and/or properties tailor-made for specific applications is known, among others, from WO 2007/091942 and WO 2015/180844.

After manufacture, microfibrillated cellulose is typically present as a "paste" of comparatively high viscosity, i.e. as a suspension of solid microfibrillated fibrils in a solvent, typically in water. This paste (suspension) is neither a liquid nor a solid and has non-Newtonian flow properties (see FIG. 1 for a photograph of microfibrillated cellulose at a solids content of 8%-10%). In accordance with the understanding of the skilled person, it is difficult to provide a coating of such a highly viscous paste by way of spraying/deposition. Therefore, it would be highly desirable to provide processes for coating such a paste of comparatively high viscosity onto a surface, in as even and homogenous a manner as possible.

From WO 2010/102802, a process for spraying microfibrillated cellulose onto a cold surface, for example a rolling cooled drum, is known. However, the prior art is primarily concerned with cooling and drying microfibrillated cellulose and provides no tangible solution how to achieve permanent or lasting MFC coatings on surfaces, wherein said coatings are as even and homogeneous as possible. In fact, WO 2010/102802 discloses that MFC forms particles or flakes when hitting the rolling drum.

Conventional coating methods for applying thin films of a paste-like substance onto a surface rely on mechanical means for applying said paste, for example in processes of rolling, calendaring, or blade coating. However, such known coating methods are not well suited for applying an even coating of a high viscosity substance and require mechanical means and contact of these means with the surface.

Furthermore, deposition processes (e.g. vapor deposition) are also generally known for the formation of thin films onto a variety of surfaces. However, such deposition methods are not suitably adaptable for MFC, which is a suspension of fibrils in a solvent.

Based on the above, it is an object of the present invention to provide a process for the spraying of MFC, having a MFC solids content in the range of 1% weight by weight ("w/w")-50% w/w, preferably a MFC solids content of 2% w/w-30% w/w, further preferably a MFC solids content of 3% w/w-15% w/w, more preferably 4% w/w-15% w/w, even more preferably 5% w/w-15% w/w, onto a surface, which process results in an MFC coating that is as even and as homogeneous as possible and reproduceably adheres to different types of surfaces. Also, said process should, at least not initially, not require the contact of any mechanical means with said surface.

SUMMARY OF THE PRESENT INVENTION

Surprisingly, the inventors have found that using a nozzle of a specific geometry, which nozzle induces a pressure drop in regards to a volume segment upstream of the nozzle vis-à-vis a volume segment downstream of the nozzle, allows to not only reproducibly and continuously spray high viscosity microfibrillated cellulose, having the high solids content as outlined above, onto a surface, but also allows to apply said microfibrillated cellulose onto a variety of surfaces including, but not limited to: paper, cardboard, composites, gypsum, concrete, ceramics, insulation materials, such as glass or rockwool, foams, water, metals plexiglass, glass, plastics, rubber, packaging materials felts, textiles and fabrics (with or without barrier properties), natural fibers like wool and yarn, fur, synthetic fur, viscose nylon. The process according to the present invention results in a comparatively thin and homogeneous layer. These comparatively thin and homogeneous layers (MFC films) provide a continuous and "closed" coating, which is useful as, e.g., an air/oxygen-barrier.

The method of the present invention does not require contact of the spraying equipment with the surface, nor does the method require (while optionally allowing for this, as post-treatment) any further method steps to control or change the thickness of MFC layer as applied onto the surface.

Therefore, in accordance with the present invention, at least a subset of the above-stated problems is solved by a process for spraying microfibrillated cellulose onto a surface, said microfibrillated cellulose having a MFC solids content in the range of 1% weight by weight ("w/w")-50% w/w, preferably 2% w/w-30% w/w, further preferably 3% w/w-15% w/w, more preferably 4% w/w-15% w/w, even more preferably 5% w/w-15% w/w, wherein said process comprises at least the following steps:

(i) providing microfibrillated cellulose in a solvent, wherein the MFC solids content is in the range of 1% weight by weight ("w/w")-50% w/w, preferably 2% w/w-30% w/w, further preferably 3% w/w-15% w/w, more preferably 4% w/w-15% w/w, even more preferably 5% w/w-15% w/w and providing a surface;

(ii) spraying said microfibrillated cellulose from step (i), through a nozzle, onto said surface, wherein said nozzle is provides a pressure drop of from 2 bar to 200 bar, preferably of from 5 bar to 100 bar, further preferably of from 10 bar to 50 bar, wherein said pressure drop is measured in regard to a volume segment upstream of the nozzle and a volume segment downstream the nozzle.

In accordance with the present invention, a volume segment "upstream" of the nozzle means a volume segment that is situated at a location that is ahead of the nozzle, but inside the overall device that comprises the nozzle, in particular the spraying head comprising the nozzle, i.e. the pressure is measured prior to the MFC being pressed through the nozzle. Correspondingly, "downstream" relates to the pressure measured at a location that is situated after the exit of the nozzle, i.e. a volume segment in which the MFC is sprayed onto the surface, which is typically at ambient pressure.

In embodiments of the present invention, the coated film from step (ii) is subjected to a subsequent drying step (iii), in which the film is dried by applying heat from 20° C. to 220° C., preferably from 40° C. to 200° C., further preferably from 60° C. to 190° C. This heating/drying step further stabilizes the film as coated onto the substrate.

In embodiments of the present invention, the temperature of said surface is from −25° C. to 200° C., preferably from 0° C. to 150° C., further preferably from 5° C. to 100° C., further preferably from 10° C. to 70° C. These temperatures have been shown to lead to stable and homogeneous films, in particular films that do not "flake off" the surface. If the temperature is lowered below these ranges, unwanted freeze-drying may occur, which negatively impacts stability and homogeneity of the films as deposited.

The fact that the method of the present invention allows to process paste-like substance with a comparatively high solids content is associated with the advantage that less solvent, for example water, needs to be removed in the drying step, i.e. the drying may occur relatively fast and with comparatively less disruption of the morphology of the thin film as applied onto the surface.

In embodiments of the present invention, subsequent to step (ii) and/or subsequent to step (iii), an additional step (iv) of mechanically adjusting the film thickness and/or film morphology is provided. Said adjusting ("flattening") step preferably comprises the use of mechanical means, in particular single or multiple rollers or cylinders nips, drums etc., and/or of at least one spatula, blade, squeegee, knife edge, plate or the like.

In embodiments of the present invention, the nozzle is part of device that comprises at least one feeder unit (2), at least one pump (3) and at least one nozzle, as illustrated in FIG. 2. The embodiment illustrated in FIG. 2 also comprises a motor (1).

In preferred embodiments, the feeder unit (2) comprises a hopper and a feeder.

In preferred embodiments, the pump (3) is selected from the group consisting of distribution pumps, progressive cavity pumps, progressive cavity pumps with back flow.

Microfibrillated cellulose" (MFC) in accordance with the present invention is to be understood as relating to cellulose fibers that have been subjected to a mechanical treatment resulting in an increase of the specific surface and a reduction of the size of cellulose fibers, in terms of cross-section (diameter) and/or length, wherein said size reduction preferably leads to "fibrils" having a diameter in the nanometer range and a length in the micrometer range.

In embodiments the microfibrillated cellulose comprises "fibrils" having a diameter in the 1 nm to 1 μm range and a length in the 0.5 μm to 500 μm range.

In accordance with the present invention, other components or additives may be present in the suspension of MFC in a solvent as provided in step (i). The solids content of MFC is given in % weight of solids vis-à-vis the overall weight of the composition including solvent.

Specifically, in accordance with the present invention, the "solids content" of MFC is measured, in particular for water as the solvent, by oven drying (105° C., 16 hours) the MFC as present together with the solvent. At least 30 g of sample is weighed into a pre-weighed aluminum weighing dish. The sample is then dried at 105° C. for 16 hours, which removes the solvent. The aluminum weighing dish with the dried matter is weighed, and dry matter is calculated based on the formula [[Weight (dish plus sample after drying)−Weight (dish)]*100%]/Weight (sample before drying).

The composition comprising microfibrillated cellulose and at least one solvent may have a dynamic viscosity that is more than 100 times or 10000 times or 100000 times higher than the viscosity of water. In an aqueous dispersion or suspension, microfibrillated cellulose preferably has non-Newtonian flow properties, for example displaying shear thinning and a gel-like consistency.

In embodiments of the invention, the nozzle geometry, i.e. the cross-section of the exit of the nozzle, from which on the MFC expands into the direction of the surface is essentially round or oblong (oval), wherein, further preferably, the largest length scale describing said cross-section (diameter) is from 0.1 mm to 10 mm, further preferably from 0.3 mm to 5 mm, and wherein the smallest length scale describing said cross-section (diameter) is from 0.1 mm to 10 mm, preferably from 0.5 mm to 2.5 mm.

In case of an essentially round cross-section, largest and smallest diameter essentially coincide with each other.

In embodiments of the invention, the nozzle geometry, i.e. the cross-section of the exit of the nozzle, from which on the MFC expands into the direction of the surface is slit-like, i.e. the width of the nozzle is at least 10 times, preferably at least 20 times the height of the nozzle.

In the direction perpendicular to the nozzle cross-section, the nozzle is preferably cone-shaped or tapered, i.e. the cross-section of the nozzle continually decreases, perpendicular to said cross-section.

Preferably, a flat-jet nozzle or a flat-spray nozzle adapted to the high viscosity of the microfibrillated cellulose composition is used in step (ii)

Flat-jet nozzles as known in the art are one-component nozzles, wherein the jet is adjusted by the overall pressure applied. The term "one-component nozzle" means that only one component is passed through said nozzle. If such a one-component nozzle is used in the method according to the invention, the high viscosity of the composition to be applied onto said surface requires a high spraying pressure, which in turn accelerates the jet. Therefore, preferably, a so-called two-component nozzle is used, which allows for reduced values of the spraying pressure.

The term "two-component nozzle" means that two components are simultaneously or concurrently passed through said nozzle. Herein, said two components preferably comprise (a) compressed fluid and (b) microfibrillated cellulose in a liquid/solvent.

In a preferred embodiment, compressed fluid is used to expand the MFC through the exit of the nozzle.

In embodiments of the present invention said compressed fluid is air.

The distance from which the MFC is sprayed onto said surface is preferably in the range of from 100 mm to 1000 mm, further preferably 200 mm to 700 mm, further preferably approximately 300 mm to 500 mm.

In embodiments of the present invention the nozzle is a flat jet nozzle

In embodiments of the present invention two or more nozzles may be used for spraying MFC onto a surface. Said two or more nozzles may be adjusted to have the same or different angles relative to the surface that is to be coated. For example, both nozzles may be at a 90° angle vis-à-vis the surface, or they may be angled against each other, for example, to be positioned at 85° and 105°, respectively, relative to the surface. In embodiments, said two or more nozzles may be displaced relative to each other, in the direction of the movement.

In embodiments, the spraying patterns as deposited may overlap or, preferably, may not overlap. A continuous deposition may be achieved by moving the surface(s), the nozzle(s), or both.

In embodiments of the invention, the coating thickness of the MFC film coated onto the substrate, as resulting from step (ii), is from 50 μm to 5 mm, preferably from 50 μm to 2 mm, further preferably 80 μm 500 μm. Further preferably said thickness does not vary by more than 50%, preferably not by more than 20% across said surface.

In embodiments of the invention, the thickness of the layer as coated onto the substrate is adjusted by adjusting the flow rate of the MFC through the nozzle. Also, the pressure drop depends on the flow rate.

In embodiments, the flow rate is 10 g/min to 10,000 g/min, preferably 50 g/min to 5,000 g/min, 100 g/min to 3,000 g/min or 300 g/min to 1,000 g/min. Preferably, in combination with a nozzle diameter of 0.5 to 2.2 mm, the shear rate through the nozzle is between 3,000 and 1,360,000 $s^{-1}$.

In embodiments of the present invention, the MFC as used in step (i) to be sprayed onto a surface, has a complex viscosity in PEG of from 20 Pa s-100 Pa s, preferably 30 Pa s-90 Pa s.

The complex viscosity in PEG or "PEG viscosity" as used in accordance with the present invention is measured with PEG400 as the solvent at a dosage of 0.65% MFC in PEG/water. The concentration of PEG and water in the suspension, respectively, is 60% and 39%. "PEG 400" is a polyethylene glycol with a molecular weight between 380 and 420 g/mol and is widely used in pharmaceutical applications and therefore commonly known and available. The complex viscosity was measured on a rheometer of the type Anton Paar Physica MCR 301. The temperature in all measurements was 25° C. and a "plate-plate" geometry was used (diameter: 50 mm). The rheological measurement was performed as an oscillating measurement (amplitude sweep), and the complex viscosity in the plateau of the amplitude sweep is measured.

In accordance with the present invention, the present method of coating a surface may be used in or for any one of the following applications, without being limited to these applications: coatings, adhesives, (surface) sizes, paints, inks, de-icing coatings, thixotropic coatings, coatings in scar and wound care, coatings in composite materials, for example plastics, rubber or paper-based materials, cardboards etc., in separation technologies, including filter elements, membranes, separators etc., in film forming applications, in battery technology and/or flexible electronics, in textile application, as coatings for non-wovens, meshes etc.

DETAILED DESCRIPTION OF THE INVENTION

The invention is described in more detail in the following, with reference to the enclosed figures, which are only meant to be illustrative, wherein.

"Microfibrillated cellulose" (MFC) in accordance with the present invention is to be understood as relating to cellulose fibers that have been subjected to a mechanical treatment resulting in an increase of the specific surface and a reduction of the size of cellulose fibers, in terms of cross-section (diameter) and/or length, wherein said size reduction preferably leads to "fibrils" having a diameter in the nanometer range and a length in the micrometer range.

In cellulose, which is the starting product for producing microfibrillated cellulose (typically present as a "cellulose pulp"), no, or at least not a significant or not even a noticeable portion of individualized and "separated" cellulose "fibrils" can be found. The cellulose in wood fibres is an aggregation of fibrils. In cellulose (pulp), elementary fibrils are aggregated into microfibrils which are further aggregated into larger fibril bundles and finally into cellulosic fibres. The diameter of wood based fibres is typically in the range 10-50 μm (with the length of these fibres being even greater). When the cellulose fibres are microfibrillated, a heterogeneous mixture of "released" fibrils with cross-sectional dimensions and lengths from nm to μm may result. Fibrils and bundles of fibrils may co-exist in the resulting microfibrillated cellulose.

Microfibrillated cellulose consists of fibrils in constant interaction with each other in a three-dimensional network. The most important performance properties of MFC-high viscosity at rest, shear thinning (thixotropic) behavior, water holding capacity-are a result of the existence of this entangled network.

In the microfibrillated cellulose ('MFC') as described throughout the present disclosure, individual fibrils or fibril bundles can be identified and easily discerned by way of conventional optical microscopy, for example at a magnification of 40×, or by electron microscopy.

In accordance with the present invention, the term "suspension" is understood to mean a liquid, in which solid particles (here: fibers) are dispersed, as generally understood by the skilled person and as defined in the IUPAC "Gold Book", [PAC, 1972, 31, 577 (*Manual of Symbols and Terminology for Physicochemical Quantities and Units, Appendix II: Definitions, Terminology and Symbols in Colloid and Surface Chemistry*); page 606].

Figure 1:
FIG. 1 shows microfibrillated cellulose at a MFC dry matter content of approx. 8% to 10%; the "paste"-like structure of MFC is apparent.

In the present invention, the suspension of microfibrillated cellulose fibers in a solvent, has the consistence of a "paste" and shows non-Newtonian flow properties (see FIG. 1). Such a suspension/paste is sometimes also referred to as a "gel" (or "hydrogel" if the solvent is water).

Unless indicated otherwise, any parameter referred to in the present disclosure is measured at standard conditions, i.e. at room temperature (20° C.), ambient pressure (1 bar) and 50% ambient humidity. Unless indicated otherwise, any ratio given for an amount of component of the overall system is meant to be given in % weight relative to the overall weigh of the content of the system (i.e. excluding packaging).

No limitations exist in regard to the solvent, as long as the solvent is capable to keep the MFC fibers in suspension under conditions typical for storage and transport.

In embodiments of the invention, the solvent is a hydrophilic solvent, preferably a polar solvent, further preferably a protic solvent.

In a preferred embodiment, said at least one liquid is water, a water-compatible solvent or an organic solvent or any mixture of two or more of said liquids. Preferred liquids are protic liquids, i.e. liquids in which the molecules of the liquid have a dissociable hydrogen atom.

Preferred protic liquids are water, lower alcohols, ethylene glycol and oligo(ethylene glycols), and mixtures of said protic liquids. Therein, the term "lower alcohol" comprises alcohols having from one to 10 carbon atoms in the carbon backbone. Preferred alcohols are methanol, ethanol, the propanol isomers, butanol isomers, and mixtures of said alcohols. The term "oligo(ethylene glycol)" encompasses diethylene glycol, triethylene glycol, tetraethylene glycol, pentaethylene glycol, and mixtures of said glycols. Further suitable liquids are e.g. dimethylsulphoxide and glycerol.

Preferred solvents are water or alcohol or any mixture of such solvents. In preferred embodiments the solvent essentially consists of water, i.e. comprises at least 90%, preferably at least 95%, further preferably at least 99% of water. "Water" can be distilled water, processed water or tab water as commonly used in industrial applications.

In a preferred embodiment, the liquid used in the method of the invention comprises water in combination with another liquid, preferably one or more of the aforementioned protic liquids.

In an alternate embodiment that is particularly preferred when the end use of the dried MFC is in the field of polymers, adhesives, coatings, gel coats or paints, the at least one liquid is or comprises an organic solvent, or at least one liquid is an organic solvent.

Depending on the liquid used, however, the addition of (an) additive(s), including, but not limited to surfactants, cellulose derivatives, salts, dispersing aids, preservatives, polysaccharides, proteins, drying additives, may be advantageous and therefore within the scope of the present invention.

As already indicated above, in principle, any type of microfibrillated cellulose (MFC) may be used in accordance with the present invention, as long as the fiber bundles as present in the original cellulose pulp are sufficiently disintegrated in the process of making MFC so that the average diameter of the resulting fibrils is in the nanometer-range and therefore more surface of the overall cellulose-based material has been created, vis-à-vis the surface available in the original cellulose material. MFC may be prepared according to any of the processes described in the art, including the prior art specifically cited in the "Background"-Section above.

Origin of the Cellulose Used to Prepare the MFC

In accordance with the present invention, there is no specific restriction in regard to the origin of the cellulose, and hence of the microfibrillated cellulose. In principle, the raw material for the cellulose microfibrils may be any cellulosic material, in particular wood, annual plants, cotton, flax, straw, ramie, bagasse (from sugar cane), suitable algae, jute, sugar beet, citrus fruits, waste from the food processing industry or energy crops or cellulose of bacterial origin or from animal origin, e.g. from tunicates.

In a preferred embodiment, wood-based materials are used as raw materials, either hardwood or softwood or both (in mixtures). Further preferably softwood is used as a raw material, either one kind or mixtures of different soft wood types. Bacterial microfibrillated cellulose is also preferred, due to its comparatively high purity.

Modified (Derivatized) and Non-Modified (Un-Derivatized) Cellulose/MFC

In Principle, the Microfibrillated Cellulose in Accordance with the Present Invention May be unmodified in respect to its functional groups or may be physically modified or chemically modified, or both.

Chemical modification of the surface of the cellulose microfibrils may be achieved by various possible reactions of the surface functional groups of the cellulose microfibrils and more particularly of the hydroxyl functional groups, preferably by: oxidation, silylation reactions, etherification reactions, condensations with isocyanates, alkoxylation reactions with alkylene oxides, or condensation or substitution reactions with glycidyl derivatives. Chemical modification may take place before or after the defibrillation step.

The cellulose microfibrils may, in principle, also be modified by a physical route, either by adsorption at the surface, or by spraying, or by coating, or by encapsulation of the microfibril. Preferred modified microfibrils can be obtained by physical adsorption of at least one compound. The MFC may also be modified by association with an amphiphilic compound (surfactant).

However, in preferred embodiments, the microfibrillated cellulose is not physically modified.

In a preferred embodiment of the present invention, the microfibrillated cellulose is prepared by a process, which comprises at least the following steps:

(a) subjecting a cellulose pulp to at least one mechanical pretreatment step;

(b) subjecting the mechanically pretreated cellulose pulp of step (a) to a homogenizing step, which results in fibrils and fibril bundles of reduced length and diameter vis-à-vis the cellulose fibers present in the mechanically pretreated cellulose pulp of step (a), said step (b) resulting in microfibrillated cellulose;

wherein the homogenizing step (b) involves compressing the cellulose pulp from step (a) and subjecting the cellulose pulp to a pressure drop.

The mechanical pretreatment step preferably is or comprises a refining step. The purpose of the mechanical pretreatment is to "beat" the cellulose pulp in order to increase the accessibility of the cell walls, i.e. to increase the surface area.

Prior to the mechanical pretreatment step, or in addition to the mechanical pretreatment step, enzymatic (pre)treatment of the cellulose pulp is an optional additional step that may be preferred for some applications. In regard to enzymatic pretreatment in conjunction with microfibrillating cellulose, the respective content of WO 2007/091942 is incorporated herein by reference. Any other type of pretreatment, including chemical pretreatment is also within the scope of the present invention.

In the homogenizing step (b), which is to be conducted after the (mechanical) pretreatment step, the cellulose pulp slurry from step (a) is passed through a homogenizer at least once, preferably at least two times, as described, for example, in PCT/EP2015/001103, the respective content of which is hereby incorporated by reference.

EXAMPLES

Example 1

Preparation of Microfibrillated Cellulose

MFC in accordance with the present invention is commercially available and commercialized by Borregaard as "Exilva", based on cellulose pulp from Norwegian spruce (softwood).

The MFC used for the spraying was present as a paste, having a solids content of 10%. The solvent was water.

The MFC was provided in two different qualities, named Exilva P and Exilva F. The differences between Exilva P and Exilva F are related mainly to the size of the aggregates of microfibrils and consequently to the 3D-network properties. Exilva "F" has higher Brookfield viscosity, surface area (water retention) and higher tensile strength than Exilva "P".

Example 2

Preparing of an MFC Coating on a Non-Woven Substrate

Figure 2:
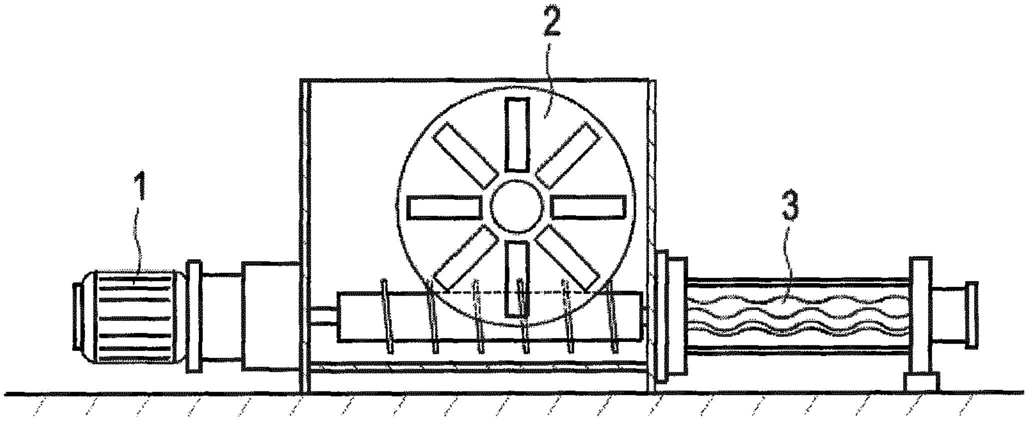
FIG. 2 shows a schematic representation of a unit for spraying, comprising a pump and a feeder.
Figure 3:
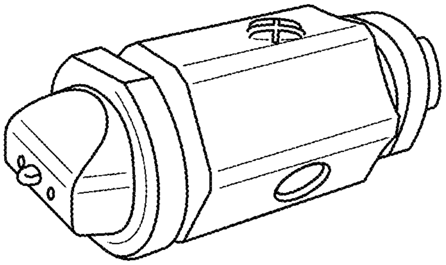
FIG. 3 shows an exemplary embodiment of the nozzle (left panel); the right panel shows an example of a spray pattern on a surface
Figure 3:
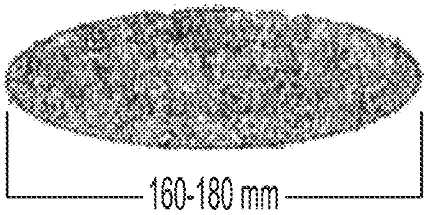

10% Exilva paste was fed into a progressive cavity pump with hopper and feeder (Netzsch) (see FIG. 2). This pump was feeding, in parallel, two smaller progressive cavity pumps with back-flow Each of the two smaller pumps was feeding directly to a full cone spraying nozzle, using pressurized air (Schilck, model 930/7-1).

Transportation from pump to nozzle: short as possible pipe and hose with large diameter (10 mm) and preferably no or few restrictions/bends.

Nozzle settings balancing flow-rate of paste with amount/pressure of atomizing air. Flow-rates of paste per nozzle: tested 200 to 1000 grams/min. Corresponding air-pressure: 3-6 bars.

Adjusted nozzle cap in outer position to get optimal and even spraying pattern.

The two nozzles were placed (fixed positions) vertically in the direction of the movement of the template. The nozzles were displaced to avoid interference of the droplets. The load of the paste to the template (Nonwoven felt) was tested from ca 5 to 50 g of dry Exilva/m$^2$.

Figure 4:
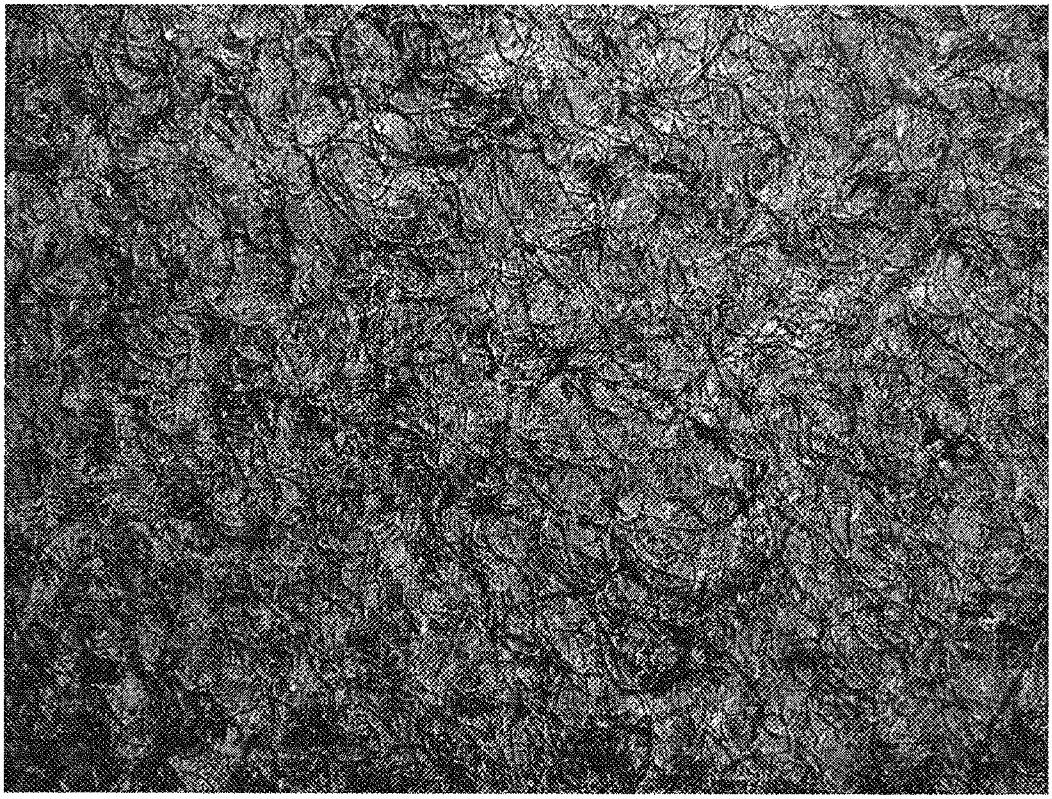
FIG. 4 shows a photograph of a non-woven web as a substrate (surface) as coated with a layer of MFC.

To evaluate the results, the coated surface (see FIG. 4) was dried at 180° C. for 60 sec in a convection oven and analyzed for air-permeability. The permeability decreased from ca 3500 to 100-300 L/m$^2$*s$^{-1}$.

Example 3

Preparing of MFC Coatings on Various Surfaces

10% Exilva paste was fed into progressive cavity pump with hopper and feeder (Netzsch) (see FIG. 2). This pump was feeding one smaller progressive cavity pump with back-flow. This smaller pump was feeding directly to a full cone spraying nozzle, using pressurized air (Schilck, model 930/7-1)

Transportation from pump to nozzle: short as possible pipe and hose with large diameter (10 mm) and preferably no or few restrictions/bends.

Nozzle settings balancing flow-rate of paste with amount/pressure of atomizing air. Flow-rates of paste per nozzle: tested 200 to 1000 grams/min. Corresponding air-pressure: 3-6 bars.

The nozzle was placed (fixed position) vertically in the direction of the movement of the template, at a distance of approximately 30 cm.

Figure 5:
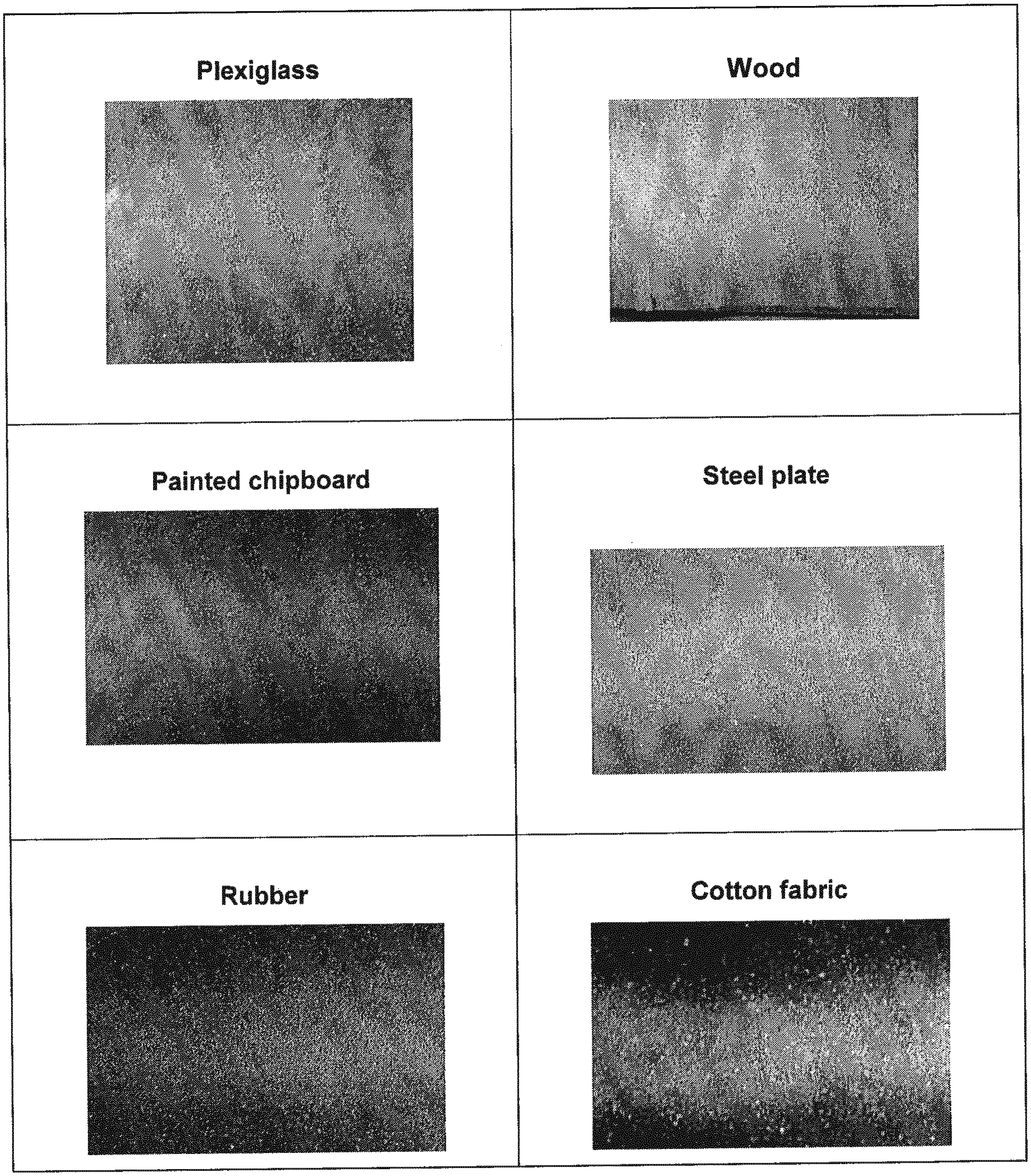
FIG. 5 shows photographs of various substrates (surfaces) coated with a layer of microfibrillated cellulose, respectively.

The following surfaces were coated with microfibrillated cellulose, in accordance with the present invention: plexiglass, wood, painted chipboard, steel plate, rubber and cotton fabric. The coated surfaces were evaluated visually (see FIG. 5), and the coated layers were found even and free from agglomerations. The MFC coating adhered well to the different surfaces.

The invention claimed is:

1. A process for spraying microfibrillated cellulose onto a surface, said microfibrillated cellulose having a MFC solids content in a range of 1% weight by weight ("w/w")-50% w/w, wherein said process comprises at least the following steps:

(i) providing microfibrillated cellulose (MFC) in a solvent, wherein solids content of the MFC is in a range of 1% weight by weight ("w/w")-50% w/w and providing a surface;

(ii) spraying said microfibrillated cellulose from step (i), through a nozzle, onto said surface, wherein said nozzle provides a pressure drop in a range of from 2 bar to 200 bar, wherein said pressure drop is measured in regard to a volume segment upstream of the nozzle and a volume segment downstream of the nozzle, wherein temperature of said surface is from −25° C. to 200° C.

2. The process according to claim 1 wherein a coated film of the MFC from step (ii) is subjected to a subsequent drying step (iii), in which the film is dried by applying heat from 20° C. to 220° C.

3. The process according to claim 1, said process comprising, subsequent to step (ii), an additional step (iii) of mechanically adjusting film thickness and/or film morphology of the film.

4. The process according to claim 1, wherein said nozzle is part of a system that comprises at least one feeder, at least one pump and at least one nozzle.

5. The process according to claim 1, wherein the nozzle comprises an exit and wherein a cross-section of the exit of the nozzle, from which on the MFC expands toward the surface is essentially round or oblong.

6. The process of claim 5, wherein a largest length scale describing said cross-section is from 0.1 mm to 10 mm and a smallest length scale describing said cross-section is from 0.1 mm to 10 mm.

7. The process according to claim 1, wherein the nozzle comprises an exit and wherein the exit of the nozzle, from which on the MFC expands toward the surface, has a cross-section in the form of a slit.

8. The process of claim 7, wherein a width of the nozzle is at least 10 times a height of the nozzle.

9. The process according to claim 1, wherein the nozzle is tapered such that a cross-section of the nozzle continually decreases, perpendicular to said cross-section.

10. The process according to claim 1, wherein said microfibrillated cellulose comprises fibrils having a diameter in a range of 1 nm to 1 μm and a length in a range of 0.5 μm to 500 μm.

11. The process according to claim 1, wherein the solvent essentially consists of water.

12. The process of claim 11, wherein the solvent comprises at least 90% water.

13. The process according to claim 1, wherein MFC is sprayed onto said surface from a distance in a range of from 100 mm to 1000 mm.

14. The process of claim 13, wherein the distance is in a range of from 200 mm to 700 mm.

15. The process according to claim 1 providing the MFC in the solvent comprises providing a drying additive in the solvent with the MFC.

16. The process according to claim 1, wherein the microfibrillated cellulose is prepared by a process, which comprises at least the following steps:

(a) subjecting a cellulose pulp to at least one mechanical pretreatment step;

(b) subjecting the mechanically pretreated cellulose pulp of step (a) to a homogenizing step, which results in fibrils and fibril bundles of reduced length and diameter vis-a-vis cellulose fibers present in the mechanically pretreated cellulose pulp of step (a), said step (b) resulting in microfibrillated cellulose;

wherein the homogenizing step (b) involves compressing the cellulose pulp from step (a) and subjecting the cellulose pulp to a pressure drop.

17. The process of claim 1, wherein the solids content of the MFC is in a range of 4% w/w-15% w/w.

18. The process of claim 1, wherein the solids content of the MFC is in a range of 5% w/w-15% w/w.

19. The process of claim 1, wherein the pressure drop is in a range of from 5 bar to 100 bar.

* * * * *